(12) United States Patent
Bardman et al.

(10) Patent No.: US 7,939,572 B2
(45) Date of Patent: May 10, 2011

(54) AQUEOUS DISPERSION OF POLYMERIC PARTICLES

(75) Inventors: James Keith Bardman, Green Lane, PA (US); Robert Mitchell Blankenship, Harleysville, PA (US); John Michael Friel, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 968 days.

(21) Appl. No.: 11/210,207

(22) Filed: Aug. 23, 2005

(65) Prior Publication Data

US 2007/0255000 A1 Nov. 1, 2007

Related U.S. Application Data

(60) Provisional application No. 60/605,892, filed on Aug. 31, 2004.

(51) Int. Cl.
*C08F 2/16* (2006.01)

(52) U.S. Cl. .......... 521/54; 521/134; 521/139; 521/142; 523/200; 523/201

(58) Field of Classification Search .......... 521/54, 521/134, 139, 142; 523/200, 201
See application file for complete search history.

(56) References Cited

U.S. PATENT DOCUMENTS

| | | | |
|---|---|---|---|
| 4,391,928 A * | 7/1983 | Herman et al. ............... 523/201 |
| 4,427,836 A | 1/1984 | Kowalski et al. | |
| 4,456,726 A | 6/1984 | Siol et al. | |
| 4,468,498 A | 8/1984 | Kowalski et al. | |
| 4,469,825 A | 9/1984 | Kowalski et al. | |
| 4,539,361 A | 9/1985 | Siol et al. | |
| 4,594,363 A | 6/1986 | Blankenship et al. | |
| 4,677,003 A | 6/1987 | Redlich et al. | |
| 4,880,842 A | 11/1989 | Kowalski et al. | |
| 4,970,241 A | 11/1990 | Kowalski et al. | |
| 4,985,064 A | 1/1991 | Redlich et al. | |
| 5,036,109 A | 7/1991 | Chip et al. | |
| 5,157,084 A | 10/1992 | Lee et al. | |
| 5,216,044 A | 6/1993 | Hoshino et al. | |
| 5,225,279 A | 7/1993 | Redlich et al. | |
| 5,340,858 A | 8/1994 | Bauer et al. | |
| 5,350,787 A | 9/1994 | Aydin et al. | |
| 5,352,720 A | 10/1994 | Aydin et al. | |
| 5,494,971 A | 2/1996 | Blankenship | |
| 5,510,422 A | 4/1996 | Blankenship et al. | |
| 5,527,613 A | 6/1996 | Blankenship et al. | |
| 5,545,695 A | 8/1996 | Blankenship | |
| 5,989,630 A | 11/1999 | Schlarb et al. | |
| 6,020,435 A | 2/2000 | Blankenship et al. | |
| 6,139,961 A | 10/2000 | Blankenship et al. | |
| 6,252,004 B1 | 6/2001 | Blankenship et al. | |
| 6,387,213 B1 | 5/2002 | Ruch | |
| 6,624,272 B2 | 9/2003 | Futami et al. | |
| 6,673,451 B2 | 1/2004 | Bardman et al. | |
| 2001/0009929 A1 | 7/2001 | Blankenship et al. | |
| 2001/0036990 A1 | 11/2001 | Bobsein et al. | |
| 2002/0065360 A1 | 5/2002 | Blankenship et al. | |
| 2002/0072560 A1 * | 6/2002 | Bardman et al. ............... 524/501 |
| 2003/0129435 A1 | 7/2003 | Blankenship et al. | |

* cited by examiner

*Primary Examiner* — Kelechi C Egwim
(74) *Attorney, Agent, or Firm* — Leah M. Reimer

(57) ABSTRACT

An aqueous dispersion of polymeric particles, the particles including: from 5% to 80% by weight, based on the weight of the polymeric particles, of a first polymer including at least one copolymerized ethylenically unsaturated monomer; and, substantially encapsulating the first polymer, from 20% to 95% by weight, based on the weight of the polymeric particles, of a second polymer including at least one copolymerized ethylenically unsaturated monomer, the second polymer having a Tg of from −40° C. to 30° C., wherein at least 90 weight % of the second polymer is formed by polymerization at a temperature of from 5° C. to 65° C. is provided. The invention also relates to a process for forming the aqueous dispersion of polymeric particles and an aqueous coating composition including the aqueous dispersion of polymer particles, a method for providing a coated substrate, and the coated substrate so provided.

14 Claims, No Drawings

AQUEOUS DISPERSION OF POLYMERIC PARTICLES

CROSS REFERENCE TO RELATED PATENT APPLICATIONS

This is a non-provisional application of prior U.S. provisional Application Ser. No. 60/605,892 filed on Aug. 31, 2004.

This invention relates to an aqueous dispersion of polymeric particles, the particles including a first polymer and a second polymer. More particularly this invention relates to an aqueous dispersion of polymeric particles, the particles including: from 5% to 80% by weight, based on the weight of the polymeric particles, of a first polymer including at least one copolymerized ethylenically unsaturated monomer; and, substantially encapsulating the first polymer, from 20% to 95% by weight, based on the weight of the polymeric particles, of a second polymer including at least one copolymerized ethylenically unsaturated monomer, the second polymer having a Tg of from −40° C. to 30° C., wherein at least 90 weight % of the second polymer is formed by polymerization at a temperature of from 5° C. to 65° C. The invention further relates to a process for forming the aqueous dispersion of polymeric particles and an aqueous coating composition including the aqueous dispersion of polymer particles, a method for providing a coated substrate and the coated substrate so provided.

The present invention in one embodiment serves to provide an aqueous coating composition suitable for use, when dry, as a coating, "coating" herein including, for example, paint, clearcoat, topcoat, primer, paper coating, leather coating, textile and nonwoven fabric coating and saturant, elastomeric coating, caulk, sealant, and adhesive. Such a coating of the present invention typically exhibits improvement in at least one of film formation, particularly at temperatures lower than 30° C. or at volatile organic compound ("VOC") levels below 5% by weight based on the total weight of the aqueous coating composition, and film integrity, relative to a coating in which an aqueous dispersion of polymeric particles of the same composition wherein at least 90 weight % of the second polymer is not formed at a temperature of from 5° C. to 65° C.

U.S. Pat. No. 4,468,498 discloses aqueous dispersions of hetero polymers including a core polymer that is at least partially encased by one or more sheath polymer compositions. Certain of the dispersions include inner sheath compositions formed using redox polymerization techniques.

The problem faced by the inventors is the provision of an aqueous composition suitable for use when dry as coating having improved film integrity such as is measured, for example, by scrub resistance, particularly in coatings compositions having low or no VOC content. In certain embodiments particles including one or more voids provide such coating compositions while concurrently reducing the mass of the particles, thereby reducing the energy which would have been expended in providing that mass.

In a first aspect of the present invention there is provided an aqueous dispersion of polymeric particles, said particles comprising: from 5% to 80% by weight, based on the weight of said polymeric particles, of a first polymer comprising at least one copolymerized ethylenically unsaturated monomer; and, substantially encapsulating said first polymer, from 20% to 95% by weight, based on the weight of said polymeric particles, of a second polymer comprising at least one copolymerized ethylenically unsaturated monomer, said second polymer having a Tg of from −40° C. to 30° C., wherein at least 90 weight % of said second polymer is formed by polymerization at a temperature of from 5° C. to 65° C.

In a second aspect of the present invention there is provided a process for forming an aqueous dispersion of polymeric particles, said process comprising: forming from 5% to 80% by weight, based on the weight of said polymeric particles, of a first polymer comprising at least one copolymerized ethylenically unsaturated monomer; and, in the presence of said first polymer, forming from 20% to 95% by weight, based on the weight of said polymeric particles, of a second polymer comprising at least one copolymerized ethylenically unsaturated monomer, said second polymer having a Tg of from −40° C. to 30° C., wherein at least 90 weight % of said second polymer is formed by polymerization at a temperature of from 5° C. to 65° C., and wherein said second polymer substantially encapsulates said first polymer.

In a third aspect of the present invention there is provided an aqueous coating composition comprising the aqueous dispersion of polymeric particles of the first aspect of the present invention.

In a fourth aspect of the present invention there is provided a method for providing a coated substrate comprising: applying said aqueous coating composition of the third aspect of the present invention to a substrate, and drying, or allowing to dry, said coating composition.

In a fifth aspect of the present invention there is provided a coated substrate formed by the method of the fourth aspect of the present invention.

This invention relates to an aqueous dispersion of polymeric particles, the particles including from 5% to 80% by weight of a first polymer, based on the weight of the polymeric particles, and from 20% to 95% by weight of a second polymer, based on the weight of the polymeric particles. Each of the first polymer and the second polymer, independently, includes at least one copolymerized ethylenically unsaturated monomer. The first and the second polymer are typically formed by free radical addition polymerization processes. Suitable ethylenically unsaturated monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, ethyl methacrylate, isodecyl methacrylate, lauryl methacrylate, hydroxyethyl methacrylate, hydroxypropyl methacrylate; (meth)acrylonitrile, and (meth)acrylamide, acetoacetoxyethyl(meth)acrylate, acetoacetoxypropyl(meth)acrylate, 2-(3-oxazolidinyl)ethyl(meth)acrylate, tert-butylaminoethyl(meth)acrylate; ethyleneureido-functional monomers; allyl acetoacetate; Ethylene; propylene; styrene and substituted styrenes; butadiene; vinyl acetate, vinyl butyrate and other vinyl esters; vinyl monomers such as vinyl chloride, vinyl toluene, and vinyl benzophenone; and vinylidene chloride. Preferred first polymers and second polymers, independently, are all-(meth)acrylic, predominantly(meth)acrylic, styrene/(meth)acrylic, and vinyl acetate/acrylic, i.e., the polymer composition includes those monomers or classes of monomers. The use of the term "(meth)" followed by another term such as acrylate or acrylamide, as used throughout the disclosure, refers to both acrylates or acrylamides and methacrylates and methacrylamides, respectively.

Each of the first polymer and the second polymer, independently, can contain from 0% to 7.5%, preferably from 0% to 2.5%, by weight of a copolymerized monoethylenically-unsaturated acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl(meth)acrylate, phosphoalkyl(meth)acrylates such as phosphoethyl(meth)acrylate, phosphopropyl(meth)acrylate, and phosphobutyl(meth)acrylate, phosphoalkyl crotonates, phosphoalkyl maleates, phosphoalkyl fumarates, phosphodialkyl(meth)acrylates, phosphodialkyl crotonates, and allyl phosphate. In some preferred embodiments an acid monomer and an amide monomer are both incorporated into the second polymer such as, for example, from 0.1 to 2.5 weight % itaconic acid and from 0.1 to 2.5 weight % acrylamide, each based on the weight of the polymer.

In some embodiments either of the first polymer and the second polymer, independently, preferably the first polymer, can contain from 0.1% to 5%, by weight based on dry polymer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Levels of such monomers must be selected, particularly for the second polymer, such that film formation is not materially compromised.

The glass transition temperature ("Tg") of the second polymer is from −40° C. to 30° C., preferably from −20° C. to 20° C., the Tg being that calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers can be found, for example, in "Polymer Handbook", edited by J. Brandrup and E. H. Immergut, Interscience Publishers.

The aqueous dispersion of polymeric particles of the present invention is typically formed by an emulsion polymerization process. The first polymer and the second polymer are preferably formed by a multistage polymerization process wherein the second polymer is formed in the presence of the first polymer. In certain preferred embodiments the first polymer can itself include multiple polymers which can be formed in multiple stages. There may be two or more phases included in the second polymer as long as each of the phases includes at least one copolymerized ethylenically unsaturated monomer, each has a Tg of from −40° C. to 30° C., and wherein at least 90 weight % of the total of the second polymer is formed by polymerization at a temperature of from 5° C. to 65° C.

The formation of the second polymer may be effected in the same reaction vessel or kettle as the formation of the first polymer. It can alternatively be carried out after a period of time, in a different reaction vessel or kettle such as a holding tank or a drain tank.

The polymerization techniques used to prepare aqueous emulsion polymers are well known in the art. In the polymerization of the aqueous dispersion of polymeric particles of this invention each polymer is prepared independently in the sense that surfactants, initiators, etc. are selected independently and can be the same or different in kind and amount for each polymer, recognizing, however, that the second polymer is prepared in the presence of previously prepared first polymer. In the emulsion polymerization process conventional surfactants can be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer.

Free radical polymerization processes including, for example, thermal, redox, photochemical, and electrochemical initiation can be used for the formation of the first polymer and the second polymer, independently. During the formation of at least 90 weight % of the second polymer the reaction temperature is maintained at a temperature of from 5° C. to 65° C.; a redox polymerization process is preferred during that interval. In certain embodiments the polymerization of the second polymer is begun at a temperature of from 5° C. to 40° C., preferably from 5° C. to 30° C., and more preferably from 15° C. to 30° C. and allowed to rise during the reaction such that the formation of at least 90 weight % of the second polymer the reaction temperature is maintained at a temperature of from 5° C. to 65° C. The monomer can be added neat or as an emulsion in water. The monomer can be added in one or more additions or continuously, linearly or not, over the reaction period, or combinations thereof.

Each of the first stage polymer and second stage polymer, independently, may be formed using suitable free radical initiators (oxidants) such as, for example, hydrogen peroxide; sodium or potassium peroxide; t-butyl hydroperoxide; t-alkyl hydroperoxide, t-alkyl peroxide, or t-alkyl perester wherein the t-alkyl group includes at least 5 Carbon atoms; cumene hydroperoxide; ammonium and/or alkali metal persulfates; sodium perborate; perphosphoric acid and salts thereof, potassium permanganate; and ammonium or alkali metal salts of peroxydisulfuric acid; typically at a level of 0.01% to 3.0% by weight, based on the weight of monomer. Redox systems using one or more oxidants with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids can be used. Redox reaction catalyzing metal salts of iron, copper, manganese, silver, platinum, vanadium, nickel, chromium, palladium, or cobalt can be used for the formation of the first polymer and the second polymer. Typical levels of catalytic metal salts used in accordance with the invention range from 0.01 ppm to 25 ppm. Mixtures of two or more catalytic metal salts can also be usefully employed. Chelating ligands which can be used when catalytic metal salts are used include multidentate aminocarboxylate ligands such as, for example, nitrilotriacetic acid (NTA, a tetradentate ligand), ethylene diamine diacetic acid (EDDA, a tetradentate ligand), N-(hydroxyethyl)ethylene diamine triacetic acid (HEDTA, a pentadentate ligand), ammonia diacetic acid (ADA, a tridentate ligand) and ethylene diamine tetraacetic acid (EDTA, a hexadentate ligand).

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans can be used to lower the molecular weight of the formed first polymer and second polymer, independently, and/or to provide a different molecular weight distribution than would otherwise have been obtained with any free-radical-generating initiator(s). Chain transfer agent(s) can be added in one or more additions or continuously, linearly or not, over most or all of the entire reaction period or during limited portion(s) of the reaction period.

The polymeric particles of the aqueous dispersion have an average particle diameter of from 20 to 1000 nanometers, preferably of from 70 to 600 nanometers. Also contemplated are multimodal particle size emulsion polymers wherein one or more of the particle size modes are polymeric particles of the present invention and wherein two or more distinct particle sizes or very broad distributions are provided as is taught in U.S. Pat. Nos. 5,340,858; 5,350,787; 5,352,720; 4,539,361; and 4,456,726.

In some embodiments the particles of the first polymer may be uniform in composition. However, in certain embodiments the particles of the first polymer may include more than one phase such as may be effected, for example, by a multistage emulsion polymerization. A multistage emulsion polymerization process in which at least two stages differing in composition are polymerized in sequential fashion usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. The multistage emulsion polymer can be formed in two or more stages, the stages differing in molecular weight as well as, or in addition to, the stages differing in composition.

In certain preferred embodiments the first polymer particles include, when dry, at least one void. First polymer particles which include a single void formed by multistage emulsion polymerization are known in the art such as is disclosed in U.S. Pat. Nos. 4,427,836; 4,469,825; 4,594,363; 4,880,842; 4,970,241; 4,677,003; 4,985,064; 5,225,279; 5,494,971; 5,545,695; 5,510,422; 5,527,613; 6,020,435; 6,252,004; 6,139,961; and 6,673,451. Such first polymer particles in the present invention are also disclosed in published US Patent Application Nos. 20010009929; 20010036990; 20020065360; and 20030129435. Suitable first polymer particles can also alternatively contain, when dry, multiple voids. Multiple voids can be formed within a first polymeric particle fully or partially enclosed by a shell polymer; by "multiple voids" herein is meant two or more voids, whether isolated or connected to other voids, whether substantially spherical in shape or not, including, for example, void channels, interpenetrating networks of void and polymer, and sponge-like structures such as are disclosed, for example, in U.S. Pat. Nos. 5,036,109; 5,157,084; 5,216,044; and 5,989,630. In alternative embodiments first polymer particles can include one or more core polymer(s) which can be dissolved out of the first polymer particle to form, when dry, a void. In additional alternative embodiments first polymer particles including or previously including pigment particles such as, for example, titanium dioxide and silicon oxide; supercritical carbon dioxide; FREON™; oxidizable compounds; and the like are also contemplated. In embodiments wherein the first polymer particles include, when dry, at least one void it is preferred that the predominant amount of the outermost polymeric surface of the first polymer particle has a Tg of greater than 50° C., preferably greater than 75° C., and more preferably greater 90° C.

The polymeric particles of the present invention include a first polymer as described herein and a second polymer substantially encapsulating the first polymer. By "substantially encapsulating the first polymer" herein is meant that greater than 50% of the surface area of the first polymer particle must be covered by second polymer. Preferably greater than 75%, more preferably 100%, of the surface area of the first polymer particle is covered by second polymer. The extent of coverage or encapsulation of the polymeric particles can be determined by scanning electron microscopy, with or without staining techniques, as is well-known in the art.

The aqueous dispersion of polymeric particles typically has a solids content of greater than 30%, preferably greater than 40%, by weight.

The aqueous coating composition of the present invention is prepared by techniques which are well known in the coatings art. First, if the coating composition is to be pigmented, at least one pigment is typically well dispersed in an aqueous medium under high shear such as is afforded by a COWLES® mixer. Then the aqueous dispersion of polymeric particles is added under lower shear stirring along with other coating adjuvants as desired. Alternatively, the aqueous dispersion of polymeric particles can be included in the pigment dispersion step. The aqueous coating composition can contain conventional coating adjuvants such as, for example, tackifiers, pigments, emulsifiers, crosslinkers, coalescing agents, buffers, neutralizers, thickeners or rheology modifiers, humectants, wetting agents, biocides, plasticizers, antifoaming agents, colorants, waxes, and anti-oxidants. The aqueous coating composition can contain up to 50%, by weight based on the weight of the polymeric particles, of an emulsion polymer not meeting the description of the aqueous dispersion of polymeric particles of the present invention, such as a film-forming and/or a non-film-forming emulsion polymer.

In one embodiment, the aqueous coating composition includes a photosensitive moiety. The photosensitive moiety is capable of absorbing some portion of the solar light spectrum and, without being bound by a particular theory, potentially acting as a photoinitiator for crosslinking of the polymer during exterior exposure. The photosensitive moiety can be a photosensitive compound added to the aqueous coating composition before, during, or after the formation of the aqueous dispersion, or a photosensitive group that is chemically incorporated into one or more of the polymers, preferably the second polymer, of the aqueous dispersion of polymeric particles, for example, by copolymerization. Examples of photosensitive compounds are benzophenone derivatives wherein one or both of the phenyl rings can be substituted such as, for example, benzophenone, 4-methyl benzophenone, 4-hydroxy benzophenone, 4-amino benzophenone, 4-chloro benzophenone, 4-hydroxycarboxyl benzophenone, 4,4'-dimethyl benzophenone, 4,4'-dichloro benzophenone, 4-carboxymethyl benzophenone, 3-nitro benzophenone, substituted phenyl ketones such as substituted phenyl acetophenones. The photosensitive groups can be present in one or more of the stages as copolymerized ethylenically unsaturated monomers that contain photosensitive groups. Examples of ethylenically unsaturated monomers that contain photosensitive groups include vinyl toluene, allyl benzoylbenzoates and monomers incorporating pendant benzophenone groups, such as vinylbenzyl methylbenzoylbenzoate, hydroxymethacryloxypropyl methylbenzoylbenzoate, hydroxymethacryloxypropyl benzoylbenzoate, and hydroxymethacryloxypropoxy benzophenone. Preferred as a photosensitive compound is benzophenone. The aqueous coating composition can contain from 0.1 to 5 weight %, preferably from 0.1 to 3 weight %, and more preferably, 0.1 to 1 weight % of one or more photosensitive compounds, based on dry polymer weight.

Preferably the aqueous coating composition contains less than 5% VOC by weight based on the total weight of the coating composition; more preferably the aqueous coating composition contains less than 3% VOC by weight based on the total weight of the coating composition; even more preferably the aqueous coating composition contains less than 1.7% VOC by weight based on the total weight of the coating composition. A volatile organic compound ("VOC") is defined herein as a carbon containing compound that has a boiling point below 280° C. at atmospheric pressure, compounds such as water and ammonia being excluded from VOCs.

Additionally, the aqueous coating composition can contain coalescing agents which are not VOCs, i.e., a coalescing agent which has a boiling point above 280° C. at atmospheric pressure. A coalescing agent is a compound that is added to a aqueous dispersion of polymeric particles, paint or coating and which reduces the minimum film forming temperature of the aqueous dispersion of polymeric particles or aqueous coating composition. by at least 1° C. The MFFT is measured using ASTM test method D2354. Examples of coalescing agents that are not VOCs include plasticizers, low molecular weight polymers, surfactants, and autooxidizable plasticizers such as alkyl esters of unsaturated fatty acids. Preferred are alkyl esters prepared from oils such as linseed, tung, dehydrated castor, soybean, tall, sunflower, and corn. Examples of non-VOC coalescing agents include esters of unsaturated fatty acids, such as mono, di-, or tri-unsaturated fatty acids. Suitable unsaturated fatty acid esters include monounsaturated fatty acid esters formed from palmitoleic acid, oleic acid, or caproleic acid; diunsaturated fatty acid esters formed from linoleic acid; triunsaturated fatty acid esters formed from linolenic acid or eleosteric acid, or mixtures thereof. Suitable esters of unsaturated fatty acids includes alkyl esters such as, such as methyl and ethyl esters; substituted alkyl esters, such as esters formed from ethylene glycol and propylene glycol; and alkyl ether esters of unsaturated fatty acids, diethylene glycol, triethylene glycol, dipropylene glycol, tripropylene glycol, and diethylene glycol monobutyl ether. In one embodiment, the above autooxidizable plasticizers are used in conjunction with an aqueous dispersion of polymeric particles which contain 0.25% to 12.5% of acetoacetoxyethyl(meth)acrylate as copolymerized units based on the total weight of the polymeric particles. Autooxidation can be enhanced by the use of metal ion catalysts such as cobalt, zirconium, calcium, manganese, copper, zinc and iron. Simple salts such as halides, nitrates, and sulfates can be used but in many cases an organic anion such as the acetate, naphthenate or acetoacetate is used.

Typical methods of paint or coating preparation can introduce adventitious VOCs from the aqueous dispersion of polymeric particles, biocides, defoamers, soaps, dispersants, and thickeners. These typically account for 0.1% VOC by weight based on the total weight of the coating composition. Additional methods such as, for example, steam stripping of the aqueous dispersion of polymeric particles and selection of low VOC containing additives like biocides, defoamers, soaps, dispersants, and thickeners, can be used to further reduce the paint or coating to less than 0.01% VOC by weight based on the total weight of the coating composition.

The solids content of the aqueous coating composition can be from 10% to 85% by volume. The viscosity of the aqueous composition can be from 0.05 to 2000 Pa·s (50 cps to 2,000,000 cps), as measured using a Brookfield viscometer; the viscosities appropriate for different end uses and application methods vary considerably.

The aqueous coating composition can be applied by conventional application methods such as, for example, brush or paint roller, air-atomized spray, air-assisted spray, airless spray, high volume low pressure spray, air-assisted airless spray, and electrostatic spray.

The aqueous coating composition can be applied to a substrate such as, for example, plastic including sheets and films, glass, wood, metal such as aluminum, steel, and phosphate or chromate-treated steel, previously painted surfaces, weathered surfaces, cementitious substrates, and asphaltic substrates, with or without a prior substrate treatment such as a primer.

The aqueous composition coated on the substrate is typically dried, or allowed to dry, at a temperature from 20° C. to 95° C.

The following examples are presented to illustrate the invention. In the examples the following abbreviations have been used
BA is Butyl Acrylate
MMA is Methyl Methacrylate
MAA is Methacrylic Acid
t-BHP is t-Butyl Hydroperoxide (70%)
SDS is sodium dodecylbenzenesulfonate (23%)
DI is Deionized
SPS is Sodium Persulphate
ALMA is Allyl Methacrylate
L is liter; wt is weight; vol is volume; g is gram; min is minute
Test Methods Particle size measurements were made by CHDF using Matec CHDF-2000 (capillary hydrodynamic fractionation); Matec Applied Sciences, Northborough, Mass.

S/Mil Determination: An aqueous dispersion was drawn down over a black vinyl scrub chart. The wet film was dried at 30% relative humidity. A Kubelka-Munk scattering coefficient was determined on the dry film (~2 mil thick) by the method of P. B. Mitton and A. E. Jacobson (Off. Digest, September 1963, p. 871-911).

Scrub Resistance: The aqueous coating compositions were drawn down on black vinyl charts using a 7 mil opening film caster. The charts were air dried in a horizontal position for 7 days in an open room kept at 73.5±3.5° F. and 50±5% relative humidity. Cut-through scrub resistance that measures the scrub resistance of a paint film by the number of scrub cycles required to erode the paint film to the substrate was determined. The procedure used a nylon bristle brush and a scrub medium prepared by blending an abrasive scrub medium type SC-2 from the Leneta Company, water and defoamer. The paint charts were secured in the abrasion tester on an aluminum plate containing shims. The brush was mounted in the holder and 10 grams of scrub medium were spread evenly on the brush bristles. The cycle counter was set at zero and the test is started. After each 400 cycles before failure, 10 more grams of scrub medium was added. The number of cycles to remove the paint film fully in one continuous line across the ½ inch width of the shim was recorded. The reported values were an average of eight measurements.

EXAMPLE 1

Formation of First Polymer

A 5 L, four necked round bottom flask was equipped with paddle stirrer, thermometer, nitrogen inlet, and reflux condenser. DI water, 1200 g, was added to the kettle and heated to 85° C. under a nitrogen atmosphere. A monomer emulsion (ME) was prepared by mixing 370 g DI water, 18.0 g SDS, 24.0 g MAA, 1056 g MMA, and 120 g BA. From this ME, 45 g were removed and set aside. With the kettle water at 85° C., 34.0 g SDS was added to the kettle. This was followed by the addition of the 45 g of ME previously set aside to the kettle and the addition of a solution of 5.0 g SPS in 50 g DI water. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered. The filtered dispersion had a solids content of 40.0% and an average particle diameter of 55 nm.

EXAMPLE 2

Formation of First Polymer

A 5 L, four necked round bottom flask was equipped with paddle stirrer, thermometer, nitrogen inlet, and reflux condenser. DI water, 1200 g, was added to the kettle and heated to 85° C. under a nitrogen atmosphere. A monomer emulsion (ME) was prepared by mixing 370 g DI water, 18.0 g SDS, 24.0 g MAA, 1056 g MMA, and 120 g BA. From this ME, 45 g were removed and set aside. With the kettle water at 85° C., 18.0 g SDS was added to the kettle. This was followed by the addition of the 45 g of ME previously set aside to the kettle and the addition of a solution of 5.0 g SPS in 50 g DI water. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered. The filtered dispersion had a solids content of 40.0% and an average particle diameter of 70 nm.

EXAMPLE 3

Formation of First Polymer

A 5 L, four necked round bottom flask was equipped with paddle stirrer, thermometer, nitrogen inlet, and reflux condenser. DI water, 1900 g, was added to the kettle and heated to 85° C. under a nitrogen atmosphere. A monomer emulsion (ME) was prepared by mixing 550 g DI water, 28.0 g SDS, 18.0 g MAA, and 1782 g styrene. From this ME, 65 g were removed and set aside. With the kettle water at 85° C., 110.0 g SDS was added to the kettle. This was followed by the addition of the 65 g of ME previously set aside to the kettle and the addition of a solution of 6.7 g SPS in 50 g DI water. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered. The filtered dispersion had a solids content of 39.7% and an average particle diameter of 58 nm.

EXAMPLE 4

Formation of First Polymer

A 5 L, four necked round bottom flask was equipped with paddle stirrer, thermometer, nitrogen inlet, and reflux condenser. DI water, 1900 g, was added to the kettle and heated to 85° C. under a nitrogen atmosphere. A monomer emulsion (ME) was prepared by mixing 550 g DI water, 28.0 g SDS, 18.0 g MAA, and 1782 g styrene. With the kettle water at 85° C., 110.0 g SDS was added to the kettle. Next, a solution of 6.7 g SPS in 50 g DI water was added to the kettle. The ME was then fed to the kettle over a two hour period at 85° C. After the completion of the monomer feed the dispersion was held at 85° C. for 15 minutes, cooled to 25° C. and filtered. The filtered dispersion had a solids content of 40.0% and an average particle diameter of 50 nm.

EXAMPLE 5

Formation of First Polymer

A 5 L, four necked round bottom flask was equipped with paddle stirrer, thermometer, nitrogen inlet, and reflux condenser. DI water, 1200 g, was added to the kettle and heated to 85° C. under a nitrogen atmosphere. A monomer emulsion (ME) was prepared by mixing 370 g DI water, 18.2 g SDS, 12.0 g MAA, and 1188 g styrene. From this ME, 45 g were removed and set aside. With the kettle water at 85° C., 18.2 g SDS was added to the kettle. This was followed by the addition of the 45 g of ME previously set aside to the kettle and the addition of a solution of 5.0 g SPS in 50 g DI water. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered. The filtered dispersion had a solids content of 38.8% and an average particle diameter of 101 nm.

EXAMPLE 6

Formation of First Polymer

A 5 L, four necked round bottom flask was equipped with paddle stirrer, thermometer, nitrogen inlet, and reflux condenser. DI water, 1200 g, was added to the kettle and heated to 85° C. under a nitrogen atmosphere. A monomer emulsion (ME) was prepared by mixing 370 g DI water, 18.2 g SDS, 12.0 g MAA, and 1188 g styrene. From this ME, 45 g were removed and set aside. With the kettle water at 85° C., 7.8 g SDS was added to the kettle. This was followed by the addition of the 45 g of ME previously set aside to the kettle and the addition of a solution of 5.0 g SPS in 50 g DI water. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered. The filtered dispersion had a solids content of 39.5% and an average particle diameter of 145 nm.

EXAMPLE 7

Formation of Aqueous Dispersion of Polymeric Particles

A 5 L, four necked round bottom flask was equipped with paddle stirrer, thermometer, nitrogen inlet, and reflux condenser. DI water, 800 g, was added to the kettle along with 375 g of the first polymer of Example 1 and adjusted to 25° C. under a nitrogen atmosphere. A monomer emulsion (ME) was prepared by mixing 340 g DI water, 22.0 g SDS, 13.5 g MAA, 553.5 g MMA, and 783.0 g BA. With the kettle temperature at 25° C., a solution of 20 g of 0.1% iron sulfate and 2 g of 1% ethylenediamine tetra acetic acid, sodium salt (Versene) was added to the kettle. Two minutes later co-feed #1 consisting of 3.9 grams t-BHP dissolved in 90 g DI water, and co-feed #2 consisting of 2.7 g iso-ascorbic acid dissolved in 90 g DI water were fed to the reactor at a rate of 0.5 g/min. Two minutes later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 min. Upon completion of the co-feeds 12 g ammonium hydroxide (28%) was added to the kettle. The dispersion was then cooled to 25° C. and filtered to remove any coagulum. The filtered dispersion had a solids content of 43.5% and an average particle diameter of 117 nm.

EXAMPLE 8

Formation of Aqueous Dispersion of Polymeric Particles

A 5 L, four necked round bottom flask was equipped with paddle stirrer, thermometer, nitrogen inlet, and reflux condenser. DI water, 800 g, was added to the kettle along with 373 g of the first polymer of Example 2 and adjusted to 25° C. under a nitrogen atmosphere. A monomer emulsion (ME) was prepared by mixing 340 g DI water, 22.0 g SDS, 13.5 g MAA, 553.5 g MMA, and 783.0 g BA. With the kettle temperature at 25° C., a solution of 20 g of 0.1% iron sulfate and 2 g 1% Versene was added to the kettle. Two minutes later co-feed #1 consisting of 3.9 g t-BHP dissolved in 90 g DI water, and co-feed #2 consisting of 2.7 g iso-ascorbic acid dissolved in 90 g DI water were fed to the reactor at a rate of 0.5 g/min. Two minutes later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 minutes. Upon completion of the co-feeds 12 g ammonium hydroxide (28%) was added to the kettle. The dispersion was then cooled to 25° C. and filtered. The filtered dispersion had a solids content of 43.5% and an average particle diameter of 148 nm.

EXAMPLE 9

Formation of Aqueous Dispersion of Polymeric Particles

A 5 L, four necked round bottom flask was equipped with paddle stirrer, thermometer, nitrogen inlet, and reflux condenser. DI water, 1000 g, was added to the kettle along with 377.8 g of the first polymer of Example 3 and adjusted to 22° C. under a nitrogen atmosphere. A monomer emulsion (ME) was prepared by mixing 340 g DI water, 22.0 g SDS, 13.5 g MAA, 553.5 g MMA, and 783.0 g BA. With the kettle temperature at 25° C., a solution of 20 g 0.1% iron sulfate and 2 g 1% Versene was added to the kettle. Two minutes later co-feed #1 consisting of 3.9 g t-BHP dissolved in 90 g DI water, and co-feed #2 consisting of 2.7 g iso-ascorbic acid dissolved in 90 g DI water were fed to the reactor at a rate of 0.5 g/min. Two minutes later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 40.9% and an average particle diameter of 135 nm.

EXAMPLE 10

Formation of Aqueous Dispersion of Polymeric Particles

A 5 L, four necked round bottom flask was equipped with paddle stirrer, thermometer, nitrogen inlet, and reflux condenser. DI water, 800 g, was added to the kettle along with 375 g of the first polymer of Example 4 and adjusted to 25° C. under a nitrogen atmosphere. A monomer emulsion (ME) was prepared by mixing 340 g DI water, 22.0 g SDS, 13.5 g MAA, 553.5 g MMA, and 783.0 g BA. With the kettle temperature at 25° C., a solution of 20 g 0.1% iron sulfate and 2 g 1% Versene was added to the kettle. Two minutes later co-feed #1 consisting of 3.9 g t-BHP dissolved in 90 g DI water, and co-feed #2 consisting of 2.7 g iso-ascorbic acid dissolved in 90 g DI water were fed to the reactor at a rate of 0.5 g/min. Two minutes later the feed of the ME was started at a rate of 5.0 g/min. The ME feed rate was gradually increased so the ME feed finished in 180 min and the temperature was allowed to rise without any external heat or cooling. The temperature at the end of the ME was ~65° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 40.3% and an average particle diameter of 118 nm.

EXAMPLE 11

Formation of Aqueous Dispersion of Polymeric Particles

A 5 L, four necked round bottom flask was equipped with paddle stirrer, thermometer, nitrogen inlet, and reflux condenser. DI water, 800 g, was added to the kettle along with 580 g of the first polymer core of Example 5 and adjusted to 25° C. under a nitrogen atmosphere. A monomer emulsion (ME) was prepared by mixing 280 g DI water, 18.5 g SDS, 11.2 g MAA, 461.3 g MMA, and 652.5 g BA. With the kettle temperature at 25° C., a solution of 20 g 0.1% iron sulfate and 2 g 1% Versene was added to the kettle. Two minutes later co-feed #1 consisting of 3.2 g t-BHP dissolved in 80 g DI water, and co-feed #2 consisting of 2.25 g iso-ascorbic acid dissolved in 80 g DI water were fed to the reactor at a rate of 0.5 g/min. Two minutes later the feed of the ME was started at a rate of 5.0 g/min. The ME feed rate was gradually increased so the ME feed finished in 120 min and the temperature is allowed to rise without any external heat or cooling. The temperature at the end of the ME was ~60° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 43.2% and an average particle diameter of 173 nm.

EXAMPLE 12

Formation of Aqueous Dispersion of Polymeric Particles

A 5 L, four necked round bottom flask was equipped with paddle stirrer, thermometer, nitrogen inlet, and reflux condenser. DI water, 800 g, was added to the kettle along with 569.6 g of the first polymer of Example 6 and adjusted to 25° C. under a nitrogen atmosphere. A monomer emulsion (ME) was prepared by mixing 280 g DI water, 18.5 g SDS, 11.2 g MAA, 461.3 g MMA, and 652.5 g BA. With the kettle temperature at 25° C., a solution of 20 g 0.1% iron sulfate and 2 g 1% Versene was added to the kettle. Two minutes later co-feed #1 consisting of 3.2 g t-BHP dissolved in 80 g DI water, and co-feed #2 consisting of 2.25 g iso-ascorbic acid dissolved in 80 g DI water were fed to the reactor at a rate of 0.5 g/min. Two minutes later the feed of the ME was started at a rate of 5.0 g/min. The ME feed rate was gradually increased so the ME feed finished in 120 min and the temperature was allowed to rise without any external heat or cooling. The temperature at the end of the ME was ~60° C. Upon the completion of the ME feed the co-feeds were continued for another 30 min. Upon completion of the co-feeds 12 g ammonium hydroxide (28%) was added to the kettle. The dispersion was then cooled to 25° C. and filtered. The filtered dispersion had a solids content of 42.7% and an average particle diameter of 247 nm.

COMPARATIVE EXAMPLE A

Formation of aqueous dispersion of polymeric particles. A 5 L, four necked round bottom flask was equipped with paddle stirrer, thermometer, nitrogen inlet, and reflux condenser. DI water, 1000 g, was added to the kettle and heated to 90° under a nitrogen atmosphere. A monomer emulsion (ME) was prepared by mixing 340 g DI water, 22.0 g SDS, 13.5 g MAA, 553.5 g MMA, and 783.0 g BA. With the kettle temperature at 90° C., a solution of 4.4 g SPS in 40 g DI water was added to the kettle. Next, 373 grams of the first polymer of Example 2 was added to the kettle. Beginning with the temperature at 78° C. the above ME along with a solution of 1.0 g SPS in 90 g DI water were co-fed to the kettle over a three hour period. The temperature of the kettle was allowed to rise to 85°. Upon the completion of the ME feed and the co-feed the batch was held at 85° C. for another 15 m. 12 g ammonium hydroxide (28%) was added to the kettle. The dispersion was then cooled to 25° C. and filtered. The filtered dispersion had a solids content of 44.7% and an average particle diameter of 157 nm.

COMPARATIVE EXAMPLE B

Formation of aqueous dispersion of polymeric particles. A 5 L, four necked round bottom flask was equipped with paddle stirrer, thermometer, nitrogen inlet, and reflux condenser. DI water, 1000 g, was added to the kettle and heated to 90° under a nitrogen atmosphere. A monomer emulsion (ME) was prepared by mixing 340 g DI water, 22.0 g SDS, 13.5 g MAA, 553.5 g MMA, and 783.0 g BA. With the kettle temperature at 90° C., a solution of 4.4 g SPS in 40 g DI water was added to the kettle. Next, 377.8 grams of the first polymer of Example 3 was added to the kettle. Beginning with the temperature at 78° C. the above ME along with a solution of 1.0 g SPS in 90 g DI water were co-fed to the kettle over a three hour period. The temperature of the kettle was allowed to rise to 85°. Upon the completion of the ME feed and the co-feed the batch was held at 85° C. for another 15 min. 12 g ammonium hydroxide (28%) was added to the kettle. The dispersion was then cooled to 25° C. and filtered. The filtered dispersion had a solids content of 44.8% and an average particle diameter of 144 nm.

EXAMPLE 13

Preparation of Polymer Cores for Preparation of First Polymer

Core #1. A 66 MMA/34 MAA, by wt. polymer core was prepared according to the teachings of Examples 1-16 of U.S. Pat. No.6,020,435. The filtered dispersion had a solids content of 31.9% and an average particle size of 108 nm.
Core #2 A 66 MMA/34 MAA, by wt. polymer core was prepared according to the teachings of Examples 1-16 of U.S. Pat. No. 6,020,435. The filtered dispersion had a solids content of 31.8% and an average particle size of 127 nm.
Core #3 A 66 MMA/34 MAA, by wt. polymer core was prepared according to the teachings of Examples 1-16 of U.S. Pat. No. 6,020,435. The filtered dispersion had a solids content of 30.8% and an average particle size of 139 nm.

EXAMPLE 14

Preparation of First Polymer (Neutralized)

A 5-L, four necked round bottom flask was equipped with paddle stirrer, thermometer, nitrogen inlet, and reflux condenser. DI water, 1000 g, was added to the kettle and heated to 89° C. under a nitrogen atmosphere. To the heated kettle water was added 3.7 g SPS in 30 grams DI water. This was immediately followed by 219.4 grams of core #1 (Ex. 13). A monomer emulsion (ME I) which was prepared by mixing 70 g DI water, 4.7 g SDS, 70.0 g styrene, 61.6 g MMA, and 8.4 g MAA was added to the kettle over a period of 60 min at a temperature of 78° C. Upon completion of ME I, a second monomer emulsion (ME II) was prepared by mixing 218.0 g DI water, 9.3 g SDS, 657.3 g styrene, 12.6 g MAA, 4.2 g linseed oil fatty acid, and 2.1 g ALMA. Monomer Emulsion II (ME II) was added to the kettle along with a separate mixture of 0.93 g SPS dissolved in 60 g DI water over 60 minutes. The temperature of the reaction mixture was allowed to increase to 92° C. Upon completion of the ME II and co-feed, 22 g of a solution of 0.1% iron sulfate and 1% versene in water was added to the kettle. Next, a third monomer emulsion (ME III) which was prepared by mixing 54.0 g DI water, 2.0 g SDS, 168 g styrene, and 2.0 g 4-hydroxy TEMPO was added to the kettle. This was followed by the addition of 500 g hot DI water (90° C.). With the kettle temperature ~85° C., a solution of 31.0 g 50% sodium hydroxide dissolved in 600 g hot DI water was added to the kettle over 10 min. Ten minutes after the completion of the sodium hydroxide addition, a solution of 1.0 g SPS mixed with 20 g DI water was added to the kettle and the batch was held for 30 min at 85° C. The reaction mixture was then cooled to room temperature and filtered. The final neutralized latex had a solids content of 26.4%, a particle diameter of 398 nm, and a pH of 8.3.

EXAMPLE 15

Preparation of First Polymer (Unneutralized)

A 5 L, four necked round bottom flask was equipped with paddle stirrer, thermometer, nitrogen inlet, and reflux condenser. DI water, 1200 g, was added to the kettle and heated to 89° C. under a nitrogen atmosphere. To the heated kettle water was added 5.25 g SPS dissolved in 30 g DI water. This was immediately followed by 314.5 g of core #2 (Ex.13). A monomer emulsion (ME I) which was prepared by mixing 100 g DI water, 6.7 g SDS, 100.0 styrene, 88.0 g MMA, and 12.0 g MAA was added to the kettle over a period of 60 min at a temperature of 78° C. Upon completion of ME I, a second monomer emulsion (ME II) was prepared by mixing 400 g DI water, 18.0 g SDS, 1179 g styrene, 18.0 g MAA, 6.0 g linseed oil fatty acid, and 3.0 g ALMA. Monomer Emulsion II (ME II) was added to the kettle along with a separate mixture of 1.3 g SPS dissolved in 90 g DI water over 60 min. The temperature of the reaction mixture was allowed to increase to 92° C. Upon completion of the ME II and co-feed, the reaction mixture was held for 30 min at 85° C. and then cooled to room temperature and filtered to remove any coagulum formed. The final unneutralized latex had a solids content of 39.9%, an average particle diameter of 375 nm, and a pH of 2.2.

EXAMPLE 16

Preparation of First Polymer (Unneutralized)

A first polymer was prepared using 315.0 grams of Core #1 (Ex.13) following the procedure used in Example 15. The final unneutralized latex had a solids content of 39.8%, an average particle diameter of 315 nm, and a pH of 2.1.

EXAMPLE 17

Preparation of First Polymer (Unneutralized)

A first polymer was prepared using 315.0 grams of Core #3 (Ex. 13) following the procedure used in Example 15. The final unneutralized latex had a solids content of 40.1%, an average particle size of 350 nm, and a pH of 2.2.

EXAMPLE 18

Preparation of First Polymer (Unneutralized)

A 5 L, four necked round bottom flask was equipped with paddle stirrer, thermometer, nitrogen inlet, and reflux condenser. DI water, 1200 g, was added to the kettle and heated to 89° C. under a nitrogen atmosphere. To the heated kettle water was added 5.25 g SPS dissolved in 30 g DI water. This was immediately followed by 314.5 grams of core #3 (Ex.13). A monomer emulsion (ME I) which was prepared by mixing 100 g DI water, 6.7 g SDS, 100.0 g styrene, 88.0 g MMA, and 12.0 g MAA was added to the kettle over a period of 60 min at a temperature of 78° C. Upon completion of ME I, a second monomer emulsion (ME II) was prepared by mixing 400 g DI water, 18.0 g SDS, 1170 g styrene, 18.0 g MAA, 6.0 g linseed oil fatty acid, and 12.0 g ALMA. Monomer Emulsion II (ME II) was added to the kettle along with a separate mixture of 1.3 g SPS dissolved in 90 g DI water over 60 m. The temperature of the reaction mixture was allowed to increase to 92° C. Upon completion of the ME II and co-feed, the reaction mixture was held for 30 minutes at 85° C. and then cooled to room temperature and filtered. The final unneutralized latex had a solids content of 40.0%, an average particle diameter of 380 nm, and a pH of 2.2.

EXAMPLE 19

Formation of Aqueous Dispersion of Polymeric Particles

A 5 L, four necked round bottom flask was equipped with paddle stirrer, thermometer, nitrogen inlet, and reflux condenser. DI water, 700 g, was added to the kettle and heated to 85° under a nitrogen atmosphere. 1704 g of the first polymer of Ex. 14 was added to the kettle and the temperature was adjusted to 60 C. A monomer emulsion (ME) was prepared by mixing 270 g DI water, 15.0 g SDS, 378 g MMA, and 522 g BA. With the kettle temperature at 60° C., a solution of 20 g 0.1% ferrous sulfate mixed with 2 g 1% versene was added to the kettle. Next, co-feeds including a solution of 2.3 g t-BHP mixed with 80 g DI water, along with a separate solution of 1.8 g iso-ascorbic acid mixed with 80 g DI water were both added to the kettle at a rate of 0.5 g/min. Two minutes after the start of the co-feed solutions, the ME prepared previously was added to the kettle over 120 min. There was no external heat applied to the reaction. The temperature of the kettle was kept at 60° for the duration of the ME feed. Upon completion of the ME feed, the co-feed solutions were continued for another 30 min. The dispersion was then cooled to 25° C. and filtered. The filtered dispersion had a solids content of 34.8%, and an average particle diameter of 526 nm. The Kubelka-Munk scattering coefficient (S/Mil) could not be determined because the polymer did not form an adequate film when dried.

EXAMPLE 20

Formation of Aqueous Dispersion of Polymeric Particles

A 5 L, four necked round bottom flask was equipped with paddle stirrer, thermometer, nitrogen inlet, and reflux condenser. DI water, 700 g, was added to the kettle and heated to 85° C. under a nitrogen atmosphere. 1704 g of the first polymer of Ex. 14 was added to the kettle and the temperature was adjusted to 50° C. A monomer emulsion (ME) was prepared by mixing 270 g DI water, 15.0 g SDS, 378 g MMA, and 522 g BA. With the kettle temperature at 50° C., a solution of 20 g 0.1% ferrous sulfate mixed with 2 g 1% versene was added to the kettle. Next, co-feeds including a solution of 2.3 g t-BHP mixed with 80 g DI water, along with a separate solution of 1.8 g iso-ascorbic acid mixed with 80 g DI water were both added to the kettle at a rate of 0.5 g/min. Two minutes after the start of the co-feed solutions, the ME prepared previously was added to the kettle over 120 min. There was no external heat applied to the reaction. The temperature of the kettle was kept at 50° for the duration of the ME feed. Upon completion of the ME feed, the co-feed solutions were continued for another 30 min. The dispersion was then cooled to 25° C. and filtered. The filtered dispersion had a solids content of 35.5%, and an average particle size of 493 nm. The Kubelka-Munk scattering coefficient (S/Mil) could not be determined because the polymer did not form an adequate film when dried.

EXAMPLE 21

Formation of Aqueous Dispersion of Polymeric Particles

Example 20 was repeated except that DI water, 700 g, was added to the kettle and heated to 76° C. under a nitrogen atmosphere. After 1704 g of the first polymer of Ex. 14 was added to the kettle the temperature was adjusted to 40° C. The temperature of the kettle was kept at 40-44° C. for the duration of the ME feed. The filtered dispersion had a solids content of 34.6%, and an average particle size of 508 nm. The Kubelka-Munk scattering coefficient (S/Mil) was measured on the dried polymer film and found to be 0.89.

EXAMPLE 22

Formation of Aqueous Dispersion of Polymeric Particles

Example 20 was repeated except that DI water, 700 g, was added to the kettle and heated to 66° C. under a nitrogen atmosphere. After 1704 g of the first polymer of Ex. 14 was added to the kettle the temperature was adjusted to 30° C. The temperature of the kettle was allowed to increase to 58° over the duration of the ME feed. The filtered dispersion had a solids content of 34.5%, and an average particle size of 490 nm. The Kubelka-Munk scattering coefficient (S/Mil) was measured on the dried polymer film and found to be 1.07.

EXAMPLE 23

Formation of Aqueous Dispersion of Polymeric Particles

A 5 L, four necked round bottom flask was equipped with paddle stirrer, thermometer, nitrogen inlet, and reflux condenser. 1125 g of the first polymer of Ex. 17 was added to the kettle and the temperature was adjusted to 25° C. A monomer emulsion (ME) was prepared by mixing 270 g DI water, 15.0 g SDS, 369 g MMA, 9.0 g MAA, and 522 g BA. With the kettle temperature at 25° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. Two minutes after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 68 C. Next, 900 g hot DI water (90 C) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.3%, and an average particle diameter of 446 nm. The Kubelka-Munk scattering coefficient (S/Mil) was measured on the dried polymer film and found to be 0.92.

EXAMPLE 24

Formation of Aqueous Dispersion of Polymeric Particles

A 5 L, four necked round bottom flask was equipped with paddle stirrer, thermometer, nitrogen inlet, and reflux condenser. 1125 g of the first polymer of Ex. 17 was added to the kettle and the temperature was adjusted to 30° C. A monomer emulsion (ME) was prepared by mixing 270 g DI water, 15.0 g SDS, 369 g MMA, 9.0 g MAA, and 522 g BA. With the kettle temperature at 30° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. Two minutes after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 72° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.5%, and an average particle diameter of 461 nm. The Kubelka-Munk scattering coefficient (S/Mil) was measured on the dried polymer film and found to be 0.85.

EXAMPLE 25

Formation of Aqueous Dispersion of Polymeric Particles

A 5 L, four necked round bottom flask was equipped with paddle stirrer, thermometer, nitrogen inlet, and reflux condenser. 1125 g of the first polymer of Ex. 17 was added to the kettle and the temperature was adjusted to 40° C. A monomer emulsion (ME) was prepared by mixing 270 g DI water, 15.0 g SDS, 369 g MMA, 9.0 g MAA, and 522 g BA. With the kettle temperature at 40° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. Two minutes after the start of the co-feed solutions, the ME prepared previously was added to the kettle at a rate of 5 g/min. There was no external heat applied to the reaction. The temperature of the kettle was allowed to increase over the duration of the ME feed. After 40 minutes the ME feed rate was increased to 10 g/min. Upon completion of 90% of the ME feed, the ME and co-feeds were stopped and the reaction was held for 5 min. The temperature of the reaction at this point was 73° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.5%, and an average particle diameter of 466 nm. The Kubelka-Munk scattering coefficient (S/Mil) was measured on the dried polymer film and found to be 0.83.

EXAMPLE 26

Formation of Aqueous Dispersion of Polymeric Particles

A 5 L, four necked round bottom flask was equipped with paddle stirrer, thermometer, nitrogen inlet, and reflux condenser. 1125 g of the first polymer of Ex. 17 was added to the kettle and the temperature was adjusted to 50° C. A monomer emulsion (ME) was prepared by mixing 270 g DI water, 15.0 g SDS, 369 g MMA, 9.0 g MAA, and 522 g BA. With the kettle temperature at 50° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. Two minutes after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 77° C. Next, 900 g hot DI water (90 C) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 38.4%, and an average particle diameter of 466 nm. The Kubelka-Munk scattering coefficient (S/Mil) was measured on the dried polymer film and found to be 0.63.

EXAMPLE 27

Formation of Aqueous Dispersion of Polymeric Particles

A 5 L, four necked round bottom flask was equipped with paddle stirrer, thermometer, nitrogen inlet, and reflux condenser. 1125 g of the first polymer of Ex. 17 was added to the kettle and the temperature was adjusted to 60° C. A monomer emulsion (ME) was prepared by mixing 270 g DI water, 15.0 g SDS, 369 g MMA, 9.0 g MAA, and 522 g BA. With the kettle temperature at 60° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. Two minutes after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 90% of the ME feed, the ME and co-feeds were stopped and the reaction was held for 5 min. The temperature of the reaction at this point was 79° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 38.5%, and an average particle diameter of 461 nm. The Kubelka-Munk scattering coefficient (S/Mil) was measured on the dried polymer film and found to be 1.44. However, this polymer film showed evidence of porosity or dry hiding. Porosity was confirmed by wetting the polymer film with Isopar L. Hiding decreased on the polymer film under the area wetted by the Isopar L.

COMPARATIVE EXAMPLE C

Formation of aqueous dispersion of polymeric particles. A 5-liter, four necked round bottom flask was equipped with paddle stirrer, thermometer, nitrogen inlet, and reflux condenser. 1125 of the first polymer of Ex. 17 was added to the kettle and the temperature was adjusted to 85° C. A monomer emulsion (ME) was prepared by mixing 270 g DI water, 15.0 g SDS, 369 g MMA, 9.0 g MAA, and 522 g BA. With the kettle temperature at 85° C., a solution of 2.7 g SPS mixed in 90 g DI water was added to the kettle over a two hour period along with the ME prepared previously. The temperature of the kettle was kept at 85° C. for the duration of the ME feed. Upon completion of 85% of the ME, without stopping the ME or co-feed, 900 g hot water were added to the kettle along with 32 g ammonium hydroxide. After the remaining 15% of ME and co-feed were fed to the kettle, the reaction was held for 15 min at 85° C. The dispersion was then cooled to 25° C. and filtered to remove any coagulum. The filtered dispersion had a solids content of 39.1%, and an average particle diameter of 519 nm. The Kubelka-Munk scattering coefficient (S/Mi) could not be determined because the polymer did not form an adequate film when dried.

EXAMPLE 28

Formation of Aqueous Dispersion of Polymeric Particles

A 5-liter, four necked round bottom flask was equipped with paddle stirrer, thermometer, nitrogen inlet, and reflux condenser. 1125 g of the first polymer of Ex. 15 was added to the kettle and the temperature was adjusted to 25° C. A monomer emulsion (ME) was prepared by mixing 270 g DI water, 15.0 g SDS, 369 g MMA, 9.0 g MAA, and 522 g BA. With the kettle temperature at 25° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. Two minutes after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 85% of the ME feed, the ME and co-feeds were stopped and the reaction was held for 5 min. The temperature of the reaction at this point was 68° C. Next, 900 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered. The filtered dispersion had a solids content of 37.2%, and an average particle diameter of 530 nm. The Kubelka-Munk scattering coefficient (S/Mil) was measured on the dried polymer film and found to be 1.39.

EXAMPLE 29

Formation of Aqueous Dispersion of Polymeric Particles

A 5 L, four necked round bottom flask was equipped with paddle stirrer, thermometer, nitrogen inlet, and reflux condenser. DI water, 350 g, was added to the kettle and heated to 30° C. under a nitrogen atmosphere. 1125 g of the first polymer of Ex. 16 was added to the kettle and the temperature was adjusted to 19° C. A monomer emulsion (ME) was prepared by mixing 270 g DI water, 15.0 g SDS, 378 g MMA, and 522 g BA. Of this ME, 227.5 g were removed and placed in a separate container. Then, 7.2 g MAA was added to the removed 227.5 g of ME. This additional ME was designated ME2. With the kettle temperature at 19° C., a solution of 20 g 0.1% ferrous sulfate mixed with 2 g 1% versene was added to the kettle. Next, co-feeds including a solution of 2.3 g t-BHP mixed with 75 g DI water, along with a separate solution of 1.80 g iso-ascorbic acid mixed with 75 g DI water were both added to the kettle at a rate of 0.5 g/min. Two minutes after the start of the co-feed solutions, ME2 prepared previously was added to the kettle at a rate of 5 grams/minute. The temperature of the kettle was allowed to increase over the duration of the ME2 feed. When the ME2 feed reached completion, 32 g ammonium hydroxide was added to the kettle. The original ME was then fed to the kettle at a rate of 10 g/min. Upon completion of 85% of the ME feed, the ME and co-feeds were stopped and the reaction was held for 2 minutes. Next, 600 g hot DI water (90° C.) was added to the kettle. The remaining 15% of ME feed was then added to the kettle as a shot. The reaction was held for 5 minutes. The co-feed solutions were then resumed at a rate of 1.0 g/min until their completion. The dispersion was then cooled to 25° C. and filtered to remove any coagulum. The filtered dispersion had a solids content of 37.6%, and an average particle diameter of 471 nm. The Kubelka-Munk scattering coefficient (S/Mil) was measured on the dried polymer film and found to be 1.24.

EXAMPLE 30

Formation of Aqueous Dispersion of Polymeric Particles

A 5 L, four necked round bottom flask was equipped with paddle stirrer, thermometer, nitrogen inlet, and reflux condenser. 1125 g of the first polymer of Ex. 18 was added to the kettle and the temperature was adjusted to 25° C. A monomer emulsion (ME) was prepared by mixing 270 g DI water, 15.0 g SDS, 369 g MMA, 9.0 g MAA, and 522 g BA. With the kettle temperature at 25° C., a solution of 20 g 0.1% ferrous sulfate mixed with 2 g 1% versene was added to the kettle. Next, co-feeds including a solution of 2.8 g t-BHP mixed with 80 g DI water, along with a separate solution of 2.0 g iso-ascorbic acid mixed with 80 g DI water were both added to the kettle at a rate of 0.5 g/min. Two minutes after the start of the co-feed solutions, the ME prepared previously was added to the kettle at a rate of 5 g/min. There was no external heat applied to the reaction. The temperature of the kettle was allowed to increase over the duration of the ME feed. After 40 min the ME feed rate was increased to 10 g/min. Upon completion of 85% of the ME feed, the ME and co-feeds were stopped and the reaction was held for 5 min. The temperature of the reaction at this point was 68° C. Next, 800 g hot DI water (90° C.) was added to the kettle. The ME feed was then resumed at a rate of 30 g/min until completion. Immediately after completion of the ME feed, 32 g ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 39.4%, and an average particle diameter of 505 nm. The Kubelka-Munk scattering coefficient (S/Mil) was measured on the dried polymer film and found to be 1.52.

EXAMPLE 31

Formation and Evaluation of Aqueous Coating Compositions

Coating compositions including the following ingredients was prepared

TABLE 31.1

| Aqueous coating compositions | |
| --- | --- |
| Material | Weight (g) |
| TI-PURE ™ R-746 | 43.0 |
| Aqueous Dispersion of Polymer Particles | 89.81 |
| TERGITOL ™ 15-S-40 | 0.40 |
| COLLOID ™ 643 | 0.40 |
| TEXANOL ™ | 2.92 |
| NATROSOL ™ 250 MHR (3%) | 40.0 |
| Water | 19.63 |

TABLE 31.2

| Evaluation of dry aqueous coating compositions Aqueous Dispersion Paint | |
| --- | --- |
| Example# | Scrubs |
| 7 | 1083 |
| 8 | 1110 |
| 9 | 1515 |
| 10 | 1603 |
| 11 | 1343 |
| 12 | 1253 |
| Comp. A | 715 |
| Comp. B | 1025 |

The dry aqueous coating compositions including the aqueous dispersion of polymer particles of Examples 7-12 of the invention exhibit superior film integrity as measured by scrub resistance relative to the corresponding coatings including the aqueous dispersions, Comparative Examples A and B.

EXAMPLE 32

Formulation and Evaluation of Aqueous Coating Compositions

Coating compositions including the following ingredients was prepared

TABLE 32.1

| Aqueous coating compositions | |
| --- | --- |
| Material | Weight (g) |
| TI-PURE ™ R-746 | 43.0 |
| Aqueous Dispersion of Polymer Particles | 98.61 |
| TERGITOL ™ 15-S-40 | 0.40 |
| COLLOID ™ 643 | 0.40 |
| TEXANOL ™ | 2.66 |
| NATROSOL ™ 250 MHR (3%) | 47.0 |
| Water | 3.15 |

TABLE 32.2

Evaluation of dry aqueous coating compositions

| Aqueous Dispersion Example # | S/Mil | Dry density g/cc | Scrubs w/Tex |
|---|---|---|---|
| 19 | no film | 0.986 | 598 |
| 20 | no film | 0.8679 | 705 |
| 21 | 0.89 | 0.8806 | 655 |
| 22 | 1.07 | 0.8876 | 700 |
| 23 | 0.92 | 1.0135 | |
| 24 | 0.85 | 1.0194 | 1067 |
| 25 | 0.83 | 1.0042 | 962 |
| 26 | 0.63 | 1.0075 | 923 |
| 27 | 1.44* | 1.0092 | 832^ |
| Comp. C | no film | 1.0756 | 813^ |
| 28 | 1.39 | 0.9337 | 908 |
| 29 | 1.24 | 0.94 | 506 |
| 30@ | 1.52 | 0.8994 | 821 |

*porosity
^poor films; scrubs misleading
@formulated with 2% TEXANOL ™

The dry aqueous coating compositions including the aqueous dispersion of polymer particles of Examples 19-30 of the invention exhibit lower dry density, and thereby savings in polymer mass and energy to prepare the polymer with a useful level of film integrity as measured by scrub resistance relative to the corresponding coatings including the aqueous dispersion, Comparative Example C.

EXAMPLE 33

Formation and evaluation of aqueous traffic paint coating composition. An aqueous dispersion of polymeric particles of this invention (33.3% by weight first polymer and 66.7% second encapsulating polymer having Tg=10° C. (Example 33) and a commercial traffic paint binder (Comp. Ex. D) were formulated in a fast dry traffic paint as per Table 33.1

TABLE 33.1

Traffic Paint Compositions

| Ingredient | Comp. Ex. D | Example 33 |
|---|---|---|
| FASTRACK ™ 3427 quick-setting binder from Rohm and Haas Company, Philadelphia, PA | 455.8 | 0 |
| Aqueous Dispersion of Polymer Particles | 0 | 482.4 |
| Ammonium Hydroxide, 28% | 0 | 3.9 |
| Polyamine, 26.5% aqueous (as disclosed in U.S. Pat. No. 5,804,627) | 0 | 8.8 |
| TAMOL ™ 901 (30%) dispersant (ammonium salt of a polyelectrolyte) from Rohm and Haas Company | 7.1 | 5.6 |
| SURFYNOL ™ CT-136 acetylenic surfactant from Air Products and Chemicals, Inc., Allentown, PA | 2.8 | 2.8 |
| DREWPLUS ™ L-493 defoamer from Drew Chemical Company, Kearny, NJ | 5.5 | 5.5 |
| TI-PURE ™ R-900 titanium dioxide from E. I. duPont de Nemours & Company, Wilmington, DE | 100.0 | 49.8 |
| OMYACARB ™-5 calcium carbonate from Omya Inc., Proctor, VT | 760.2 | 789.4 |
| After 15 minutes, added | | |
| Methanol | 30.0 | 0 |
| TEXANOL ® solvent ester alcohol from Eastman Chemicals, Kingsport, TN | 29.9 | 13.1 |
| NATROSOL ® 250HR(2%) thickener from Aqualon, Inc, Wilmington, DE | 6.7 | 22.0 |
| Water | 8.6 | 2.8 |

The traffic paint of Example 33 was formulated with about half the level of titanium dioxide of the comparative traffic paint (Com. Ex. D) and yet exhibited improved hiding and total reflectance as shown in Table 33.2.

TABLE 33.2

Evaluation of dry traffic paint

| Test | Comp. Ex. D | Ex. 33 |
|---|---|---|
| Hiding by Contrast Ratio | 0.90 | 0.95 |
| Total Reflectance | 86.0 | 88.5 |

What is claimed is:

1. An aqueous dispersion of polymeric particles, said particles comprising:
   from 5% to 80% by weight, based on the weight of said polymeric particles, of a first polymer comprising at least one copolymerized ethylenically unsaturated monomer and formed by polymerization at a temperature of 78° C. to 92° C.; and
   substantially encapsulating said first polymer, from 20% to 95% by weight, based on the weight of said polymeric particles, of a second polymer comprising at least one copolymerized ethylenically unsaturated monomer, said second polymer having Tg of from −40° C. to 30° C., wherein polymerization of the second polymer is begun at a temperature of from 5° C. to 40° C. and the temperature is allowed to rise during the reaction such that at least 90 weight % of said second polymer is formed by polymerization at a temperature of from 5° C. to 65° C.

2. The aqueous dispersion of polymeric particles of claim 1 wherein said first polymer comprises, when dry, at least one void.

3. The aqueous dispersion of polymeric particles of claim 1 or claim 2 wherein at least 90 weight % of said second polymer is formed by redox polymerization at a temperature of from 5° C. to 65° C.

4. An aqueous coating composition comprising said aqueous dispersion of polymeric particles of claim 1 or claim 2.

5. The aqueous dispersion of polymeric particles of claim 1 wherein the first polymer or the second polymer, independently contain 0.1% to 5%, by weight based on dry polymer weight, copolymerized multi-ethylenically unsaturated monomers.

6. The aqueous coating composition of claim 4 wherein the coating composition forms a dried paint film having a scrub resistance of greater than or equal to 1083 scrubs.

7. The aqueous coating composition of claim 4 wherein the coating composition forms a dried paint film having a dry density of less than or equal to 1.0194 g/cc.

8. The aqueous dispersion of polymeric particles of claim 1 wherein the polymeric particles are unimodal in particle size.

9. The aqueous dispersion of polymeric particles of claim 1 wherein the polymeric particles, when dry, provide a coating that exhibits improvement in at least one of film formation at temperatures lower than 30° C. or at volatile organic compound levels below 5% by weight based on the total weight of the aqueous coating composition; and film integrity, relative to a coating in which an aqueous dispersion of polymeric particles of the same composition wherein polymerization of the second polymer is not begun at a temperature of from 5° C. to 40° C. and the temperature is not allowed to rise during the reaction such that at least 90 weight % of said second polymer is formed by polymerization at a temperature of from 5° C. to 65° C.

10. The aqueous coating composition of claim 4 wherein the coating composition forms a dried paint film having a Kubelka-Munk scattering coefficient of greater than or equal to 0.63 at a dried film thickness of about 2 mil.

11. An aqueous dispersion of polymeric particles having a solids content greater than 30% by weight and containing less than 5% by weight volatile organic compounds, said particles comprising:

from 10 to 33% by weight, based on the weight of said polymeric particles, of a first polymer comprising at least one copolymerized (meth)acrylic ester monomer and formed by polymerization at a temperature of 78° C. to 92° C.; and substantially encapsulating said first polymer, from 67 to 90% by weight, based on the weight of said polymeric particles, of a second polymer comprising at least one copolymerized (meth)acrylic ester monomer, said second polymer having Tg of from −40° C. to 30° C., wherein polymerization of the second polymer is begun at a temperature of from 5° C. to 40° C. and the temperature is allowed to rise during the reaction such that at least 90 weight % of said second polymer is formed by polymerization at a temperature of from 5° C. to 65° C., and wherein the polymeric particles of the aqueous dispersion have an average particle diameter of 70 to 600 nanometers.

12. The aqueous dispersion of polymeric particles of claim 11 wherein the polymerization of the second polymer is begun at a temperature of from 15° C. to 30° C.

13. The aqueous dispersion of polymeric particles of claim 11 wherein the first polymer particles include, when dry, at least one void.

14. An aqueous dispersion of polymeric particles, said particles consisting of:

a core polymer;

from 5% to 80% by weight, based on the weight of said polymeric particles, of a first polymer comprising at least one copolymerized ethylenically unsaturated monomer and formed by polymerization at a temperature of 78° C. to 92° C.; and substantially encapsulating said first polymer, from 20% to 95% by weight, based on the weight of said polymeric particles, of a second polymer comprising at least one copolymerized ethylenically unsaturated monomer, said second polymer having Tg of from −40° C. to 30° C., wherein polymerization of the second polymer is begun at a temperature of from 5° C. to 40° C. and the temperature is allowed to rise during the reaction such that at least 90 weight % of said second polymer is formed by polymerization at a temperature of from 5° C. to 65° C.

* * * * *